Aug. 16, 1932.  R. RÜDENBERG ET AL  1,872,348
VOLTAGE REGULATION OF ALTERNATING CURRENT LONG DISTANCE LINES
Filed Nov. 12, 1929
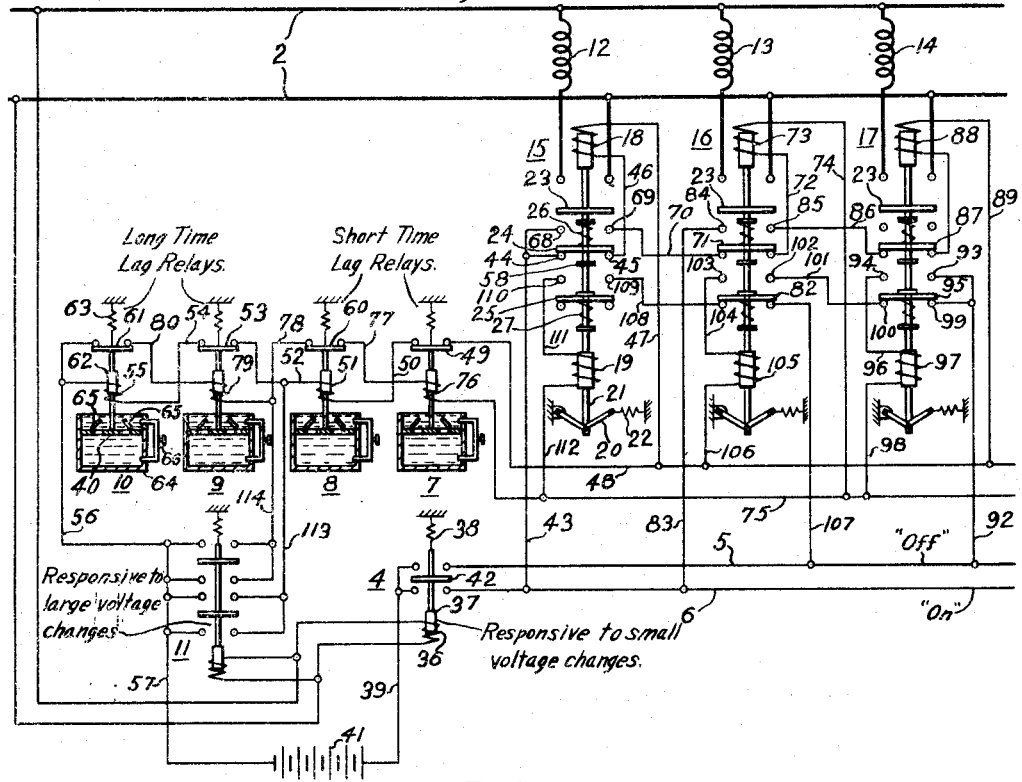
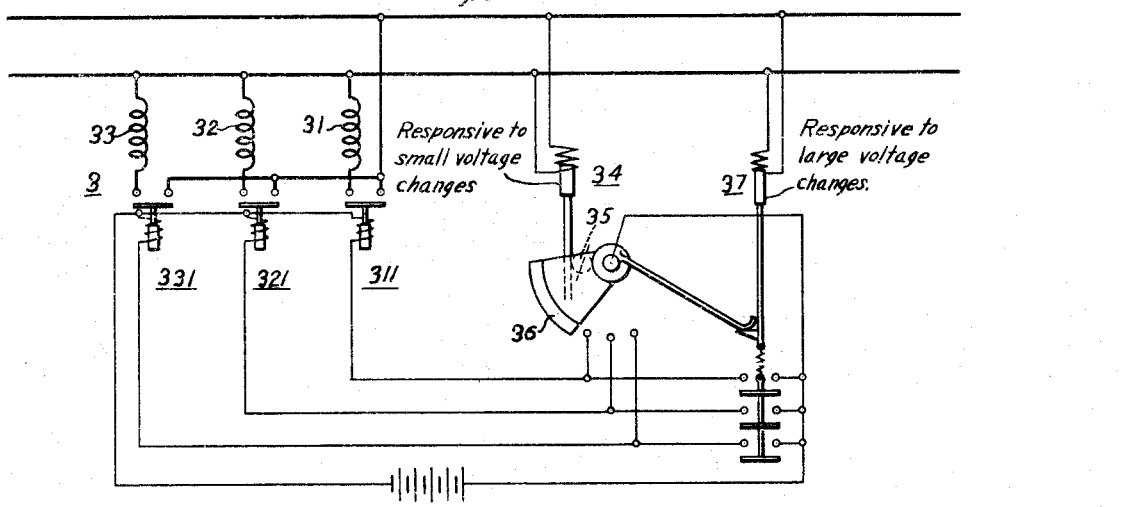
WITNESSES
INVENTORS
Reinhold Rudenberg &
Erich Friedlander
BY
ATTORNEY Patented Aug. 16, 1932

1,872,348

UNITED STATES PATENT OFFICE

REINHOLD RÜDENBERG, OF BERLIN-GRUNEWALD, AND ERICH FRIEDLÄNDER, OF BERLIN-SPANDAU, GERMANY, ASSIGNORS TO WESTINGHOUSE ELECTRIC AND MANUFACTURING COMPANY, A CORPORATION OF PENNSYLVANIA

VOLTAGE REGULATION OF ALTERNATING CURRENT LONG DISTANCE LINES

Application filed November 12, 1929, Serial No. 406,568, and in Germany November 12, 1928.

Our invention relates to improvements in the voltage regulation of alternating-current long distance lines.

It has been suggested to regulate the voltage of alternating-current long distance lines by means of compensating devices consisting of a plurality of steps which are switched in one after the other with time lag.

According to our invention the arrangement is such that the time between the switching of two steps is made to depend upon the value of the change of voltage in such a way that in case of small voltage changes or variations the interval between two steps in such that the machine regulator has time to regulate the voltage of the machine side of the line to its normal value again but that in case of great voltage changes the interval is less. In this way a steady voltage regulation is possible without the necessary regulation time of a regulating process lasting excessively long.

In order to avoid that the voltage rises too high when a large portion of the load is suddenly taken off the line (no-load operation) two or more steps of the respective compensating device required for the compensation are according to our invention switched in together without time lag if the voltage rises exceed a predetermined limit. When the voltage then drops the compensating device is again switched on and off stepwise with time lag between the individual steps. The control devices for instantaneous switching on may be controlled from two or more steps of the compensating equipment directly in dependence of the changes of the voltage or also in dependence of the cause of the sudden voltage change, for instance the sudden change of the load.

In the latter case the control devices may be directly influenced from the position of a switch which cuts a section of the network in or out.

Two embodiments of our invention are illustrated in the drawing attached to our specification.

The drawing shows:

Fig. 1, a diagram of our improved system, and

Fig. 2, a diagram of a modification of the system shown in Fig. 1.

Referring to Fig. 1 of the drawing, the transmission line, whose voltage is to be regulated, is represented by lines 2 and is shown as of the single-phase type for the sake of simplicity. A plurality of choke coils or reactance compensating devices 12, 13 and 14 are arranged for connection across the transmission line conductors by means of switching devices 15, 16 and 17, respectively, in dependence of the line voltage.

Each switch is provided with a closing coil and an opening coil and means for retaining the switch in either the opened or the closed actuated position after the respective actuating coil has been deenergized. In the switches of Fig. 1, a toggle mechanism 20, cooperating with the movable plunger element 21 of the switch, is shown for this positional retaining purpose. As will be seen, toggle 20 is acted upon by a spring 22 which is in compression. In addition to the main contact member 23 which is disposed to control the circuit of the reactor, the switch plunger rod 21 carries auxiliary contact members 24 and 25, slidably mounted on the rod to allow motion with respect thereto against the action of compression springs shown at 26 and 27, respectively.

For the purpose of initiating the actuation of one or more of the switches 15, 16 and 17, a voltage indicator 4 is disposed to be responsive to changes in the voltage between the transmission line conductors. Voltage responsive device 4 is relatively sensitive and responds to small changes, whereas a similar device 11, acting in conjunction with device 4, is disposed to respond only to relatively large voltage changes.

To introduce a time delay between successive actuations of different reactor switches, the time lag relays 7, 8, 9 and 10 are disposed in the control circuits of the switch actuating coils. Relays 9 and 10 are adjusted to give a relatively long time lag and are effective for voltage changes of normal value which operate responsive to the device 4, while relays 7 and 8 are adjusted to give a shorter time lag or delay and are effective when abnormally large voltage changes occur to cause the actuation of responsive device 11.

In operation of this system, let it be assumed that when all of the switches 15, 16 and 17 are in the open position shown, the voltage of the line rises above the normal value. Small change responsive device 4 is actuated to the downward position by the increased pull of coil 36 acting on plunger 37 which overcomes the restraining action of tension spring 38 and energizes an "on" control line 6, from a control battery 41.

This action completes a circuit which extends from battery 41 through conductor 39, contact 42 of relay 4, control line 6, conductor 43, self-breaking contact members 44 and 45 of switch 15 bridged in the open position of main contact 23 by contact member 24, conductor 46, closing coil 18 of switch 15, conductor 47, conductor 48, normally closed contact 49 of short time relay 7, conductor 50, actuating coil 51 of short time relay 8, conductor 52, normally closed contact 53 of long time relay 9, conductor 54, actuating coil 55 of long time relay 10, conductors 56 and 57, back to battery 41.

Thus energized, closing coil 18 actuates switch 15 to its closed position, thereby connecting reactor 12 across the transmission line through the main contact member 23. Closure of switch 15 moves auxiliary contact 24 out of engagement with the self-breaking elements 44 and 45, thus deenergizing closing coil 18, and by action of the toggle mechanism 20, the switch 15 is retained in its closed position until such future time as the opening coil 19 may be energized.

It will be noted that the auxiliary contact member 24 remains in engagement with contact studs 44 and 45 until after the switch plunger has passed the mid-position between the open and closed extremes, due to the action of the spring 26 and the positioning of a collar 58 on the rod 21 which does not engage contact 24 until after the mid-position mentioned has been passed. The momentum of the moving plunger, assisted by action of toggle 20, completes the closing operation from that point. It will be further noted that auxiliary contact members 24 and 25 have been moved at the completion of the closing action into engagement with the pairs of contact studs respectively shown above them.

Before contact element 24 of switch 15 interrupted the circuit already traced, which includes the actuating coils of time lag relays 8 and 10, the plungers of these two relays were actuated in a downward direction, thereby opening contacts 60 and 61, respectively.

As shown, the time lag relays employ dash-pots as a means of providing the required delay features, although it will be understood that any other equivalent mechanism well known in the art, might be used instead to accomplish this result. In operation, energization of the actuating coil 55, in the case of time relay 10, which is typical of all the relays illustrated, pulls plunger 62 downwardly against the action of a tension spring 63, thereby opening the relay contact 61 previously mentioned. Connected with plunger 62 is a piston 40 arranged to operate in a dash-pot 64, which is filled with some fluid such as oil. Valves 65 of relatively large area allow the plunger to move downwardly without appreciable retardation, thus permitting fast movement in this direction. Return movement of the piston 40 in the upward direction, which is effected by the spring 63, closes valves 65, thereby forcing the oil above the piston to flow through the by-pass 66 to get to the region below the piston. This action causes the return movement to be slow and introduces the required time delay to the reclosure of the relay contacts 61 after the coil 55 has been deenergized.

Adjustment of the time delay may be made in any well known manner such as by changing the tension of the spring 63 or the size of the by-pass 66. As has been mentioned, relays 9 and 10 are adjusted to give a relatively long time lag while relays 7 and 8 are adjusted to give a shorter time lag in the reclosure of their contacts after actuation.

If the corrective or voltage lowering action of reactor 12 has been sufficient to bring the voltage between line conductors 2 to the normal value, voltage responsive device 4 will have returned to the neutral position shown in the drawing and further action of the regulating system will have been arrested. If, however, as shall be assumed for purposes of explanation, the voltage of the line is still above normal, and responsive device 4 maintains contact 42 in the downward position to continue the energization of "on" control line 6, the system operates to cause closure of switch 16 after a time delay in the manner to be explained.

Following the closure of switch 15 and the attendant opening of auxiliary contact 24 thereof, short time relay 8 recloses its contact 60 after the delay for which it is set, and long time relay 10 recloses its contact 61 after a longer delay, thereby completing an actuating circuit for switch 16 which extends from battery 41, through responsive device 4 to control line 6, conductor 43, contact elements 68 and 69 of switch 15 bridged by segment 24, conductor 70, self-breaking contacts of switch 16 bridged by contact segment 71, conductor 72, closing coil 73 of switch 16, conductor 74, conductor 75, actuating coil 76 of short time relay 7, conductor 77, closed contact 60 of short time relay 8, conductor 78, actuating coil 79 of long time relay 9, conductor 80, closed contact 61 of long time relay 10, conductors 56, and 57 to battery 41.

Thus energized, switch 16 is moved to the closed position, thereby connecting reactor 13 across the transmission line. As in the case of switch 15, the closing operation causes contact 71 to leave the self-breaking segments, thereby interrupting the circuit just traced. Before such interruption occurs, however, time lag relays 7 and 9 have been actuated to their downward position, thereby opening contacts 49 and 53, respectively.

In closing, switch 16 sets up, through the change in position of its auxiliary contacts 71 and 82, circuits which permit the actuation of switch 17 after a time delay, assuming that voltage responsive device 4 still maintains control line 6 energized.

If such is the case, the reclosure of contact 49 of relay 7 after a short time delay and the subsequent reclosure of contact 53 of relay 9 after a longer time delay, completes an actuating circuit for switch 17 which extends from battery 41, through responsive device 4 to control line 6, conductor 83, contact elements 84 and 85 of switch 16 bridged in the closed position of main contact 23 by contact segment 71, conductor 86, self-breaking contact segments of switch 17 bridged in the open position of main contact 23 by contact segment 87, closing coil 88 of switch 17, conductor 89, conductor 48, and back to battery 41 through the actuating coils of time relays 8 and 10 and the contacts of time relays 7 and 9 as previously traced for the closing operation of switch 15.

Under the action of energized closing coil 88, switch 17 is actuated to its closed position and thereby connects reactor 14 across the transmission line. In closing, the switch energizing circuit just traced is interrupted by the upward movement of contact member 87 in a manner already explained.

It will be understood that the number of reactor elements and control switches of the type described need not be limited to three, but may be made any number sufficient to meet the needs of a system or transmission line to which the system of my invention is applied, and that the operation of units additional to those represented may readily be arranged to take place sequentially in the manner already explained.

The opening of switches 15, 16 and 17 in response to a lowering below normal of the line voltage takes place in the reverse order from the closing. As will be seen, the operations involved are similar to those already considered in connection with the closing sequence. Thus if we assume that with switches 15, 16 and 17 all closed the voltage between line conductors 2 drops below the normal value, responsive device 4 decreases the pull exerted by coil 36 and allows plunger 37 to move upwardly under the action of spring 38, causing contact segment 42 energize the "off" control line 5 to initiate an opening operation of switch 17.

The actuating circuit for this opening operation of switch 17 extends from battery 41 through responsive device 4 to "off" control line 5, conductor 92, segments 93 and 94 of switch 17 bridged in the closed position of the switch by contact segment 95, conductor 96, opening coil 97 of switch 17, conductor 98, conductor 75, back to battery 41 through the actuating coils of time relays 7 and 9 and the contacts of time relays 8 and 10 as previously traced for the closing operation of switch 16.

Closing coil 97, thus energized, moves switch 17 from the closed to the open position, thereby disconnecting reactor 14 from the transmission line. Through the action of switch contact member 95 the energizing circuit just traced is thereby opened. Before such opening occurs, however, time relays 7 and 9 move to the actuated positions as in the case of the switch closing operations already described.

Assuming that control line 5 continues to be energized through voltage responsive device 4, an opening circuit is set up by switch 16 and completed by the return of contacts 49 and 53 of time relays 7 and 9 to the closed position, which circuit extends from "off" control line 5, conductor 92, contact elements 99 and 100 of switch 17 bridged in the open position by contact segment 95, conductor 101, contact elements 102 and 103 of switch 16 bridged in its closed position by contact segment 82, conductor 104, opening coil 105 of switch 16, conductor 106, conductor 48, back to battery 41 through the actuating coils of time relays 8 and 10 and the contacts of time relays 7 and 9 as previously traced for the closing operation of switch 15.

Switch 16 thus opens under the action of its energized opening coil 105 and disconnects reactor 13 from the line. After a time delay sufficient to allow contacts 60 and 61 of time relays 8 and 10 to reclose, an opening circuit is set up for switch 15.

Assuming voltage responsive device 4 to still maintain contact segment 42 in the upward position, the opening circuit for switch 15 extends from control line 5, conductor 107, contact segment 82 of switch 18, conductor 108, contact elements 109 and 110 of switch 15 bridged in its closed position by segment 25, conductor 111, opening coil 19 of switch 15, conductor 112 to conductor 75 and thence to battery 41 through the time relay circuit already traced for the opening operation of switch 17.

Switch 15 is, accordingly, opened under the action of coil 19 and in so opening deenergizes the circuit to coil 19 by movement of contact segment 25 to the downward position shown.

In the operations so far considered, which have been assumed to be initiated by changes of sufficient magnitude to operate responsive device 4 only, it is evident that the time lag introduced between successive switch actuations has been determined by the setting of the long time lag relays 9 and 10, since they are disposed in series relation in the control circuits with the shorter time relays 7 and 8.

To reduce the time delay between switch operations in the event of abnormally large voltage changes, the responsive device 11 is connected as shown in a manner to bridge the long time relays and make them ineffective in the control circuits. Thus an abnormally large rise in voltage pulls the plunger of relay 11 to the downward position, thereby connecting through the relay contacts illustrated conductors 52 and 78, which join short time relay 8 with long time relay 9, to the conductor 57 directly, which is connected with battery 41, such connection being established through conductors 113 and 114, respectively. As will be evident, an abnormally large drop in voltage below the normal value allows plunger relay 11 to move to the extreme upward position to effect a similar bridging connection of long time relays 9 and 10.

For such a condition, it will be evident that the previously traced control circuits through conductors 52 and 78 no longer pass through the long time relays but are shunted to the control battery 41 through conductors 113 and 114, respectively, and the closed contacts of large change voltage responsive device 11. The time delay between successive switch actuations is, therefore, determined by the short time relays 7 and 8 and is consequently reduced to an amount determined by their setting.

It will be evident that should it be desired to provide for more than two different values of time delay between successive switch actuations in dependence of voltage change magnitude, additional time lag relays and voltage responsive devices may be readily combined with the system illustrated to achieve this result.

Fig. 2 of the drawing illustrates a further embodiment of our invention. Here the interval between a plurality of steps is eliminated entirely in case of particularly great voltage changes. The device for producing the interval has also been modified. In the long distance line 2, for the sake of simplicity, shown single-phase, is connected the compensating device 3 consisting of the choke coils 31, 32, and 33 adapted to be connected to the long distance line 2 by the switches 311, 321, 331. In case of small voltage changes the switches 311, 321, 331 are opened or closed by the voltage indicator 34 in dependence of the voltage, the indicator operating the control switch 36 by the clockwork 35. According to our invention a special relay 37 is provided which closes all the switches 311, 321, 331 simultaneously. The switching mechanism of the relay 37 is coupled with the switch member of the voltage indicator 34 so that it is moved into its end position in which all the choke coils are cut in. After the dropping of the voltage caused thereby the relay 37 opens again and the further regulation takes place stepwise by opening the individual switches 331, 321, 311 by the control switch 36 driven by the clockwork 35 in dependence of the position of the voltage indicator 34.

We claim as our invention:

1. The combination with an alternating-current transmission line, of a plurality of reactor compensating devices, a switching device for each reactor for connecting it across said line, means for successively actuating said switching devices sequentially in predetermined order, line voltage responsive means for governing said actuating means and time delay means associated therewith, said responsive and delay means being so disposed that in case of small voltage changes a relatively long interval is introduced between successive switching device actuations and in case of large voltage changes a smaller interval or delay is introduced.

2. An electrical system comprising a circuit and a plurality of compensating devices to effect voltage regulation thereof, a switching device for each of said compensators for connecting it with the circuit, means for successively actuating said switching devices sequentially in predetermined order, circuit voltage responsive means for governing said actuating means and time delay means associated therewith and so disposed that small changes in line voltage cause a relatively long delay to be introduced between successive switching device actuations and large changes cause a smaller delay.

3. The combination with an alternating-current transmission line, of a plurality of reactor compensating devices, a switch for each reactor for connecting it across said line and actuating means for said switches, said switches being disposed to operate successively in a predetermined order, a voltage change responsive relay operable by small changes in line voltage and disposed to initiate actuation of said switches, a second voltage change responsive relay operable only by large changes in line voltage, short time lag relays and longer time lag relays to introduce time delays between successive switch operations, said longer time lag relays being effective upon occurrence of small voltage changes which operate the first named voltage responsive relay only, and said short time lag relays being effective upon occurrence of larger voltage changes sufficient to operate also the second named voltage responsive relay.

4. The combination with an electrical circuit of a plurality of compensating devices, a switch for each device for connecting it with said circuit and actuating means for said switch, means associated with said switches for causing them to operate successively in a predetermined order, a quantity change responsive relay operable by small changes in an electrical quantity of the circuit and disposed to initiate actuation of said switches, a second change responsive relay operable only by large changes in the said electrical quantity of the circuit, short time lag relays and longer time lag relays to introduce time delays between successive switch operations, said longer time lag relays being effective upon the occurrence of small quantity changes which operate only the first named change responsive relay, and said short time lag relays being effective upon the occurrence of larger quantity changes sufficient to operate also the second named quantity responsive relay.

5. The combination with an alternating-current transmission line, of a plurality of reactor compensating devices, a switch for each reactor for connecting it across said line and actuating means for said switch, interconnecting means associated with said switches for causing them to be operated successively in a predetermined order, a voltage change responsive relay operable by small changes in line voltage and disposed to initiate actuation of the said switches, a plurality of additional voltage change responsive relays operable respectively by progressively larger changes in line voltage, a pair of similar short time lag relays, and a plurality of additional pairs of relays of progressively longer time lag corresponding to the number of additional voltage responsive relays, disposed to introduce time delays between successive switch operations, said longest time lag relays being effective upon the occurance of small voltage changes which operate the first named voltage responsive relay only, said shortest time lag relays being effective for large voltage changes which operate all the voltage change responsive relays, and intermediate time lag relays effective for voltage changes which operate a corresponding intermediate voltage change relay.

6. The combination with an alternating-current transmission line of a plurality of reactor compensating devices, a switch for each reactor for connecting it across said line, actuating means for each switch and a circuit therefor, a voltage change responsive device operable by small changes in line voltage, switching means operable by said small change responsive device for energizing the actuating circuits of said reactor switches and a time delay mechanism associated therewith for introducing a time interval between actuations of successive reactor switches, the length of the time interval being relatively long for small voltage changes and correspondingly shorter for larger voltage changes, and a second voltage change responsive device operable only by large changes in line voltage, disposed to actuate a plurality of reactor switches simultaneously, independently of the first named responsive device, when the voltage change exceeds a predetermined value.

7. The combination with an alternating current transmission line of a plurality of reactor compensating devices, a switch for each reactor for connecting it across said line, actuating means for each switch and a circuit therefor, a voltage change responsive device operable by small changes in line voltage, switching means operable by said small change responsive device for energizing the actuating circuits of said reactor switches and a time delay mechanism associated therewith for introducing a time interval between actuations of successive reactor switches, the length of the time interval being relatively long for small voltage changes and correspondingly shorter for larger voltage changes, and a second voltage change responsive device operable only by large changes in line voltage, disposed to actuate a plurality of reactor switches simultaneously, independently of the first named responsive device, when the voltage change exceeds a predetermined value in the direction of rise, normal control by said first named responsive device being set up again when the voltage drops.

In testimony whereof, we have hereunto subscribed our names this 28th day of October, 1929.

REINHOLD RÜDENBERG.
ERICH FRIEDLÄNDER.